A. CRAWFORD.
Buckwheat Huller.
No. 87,093. Patented Feb. 23, 1869.
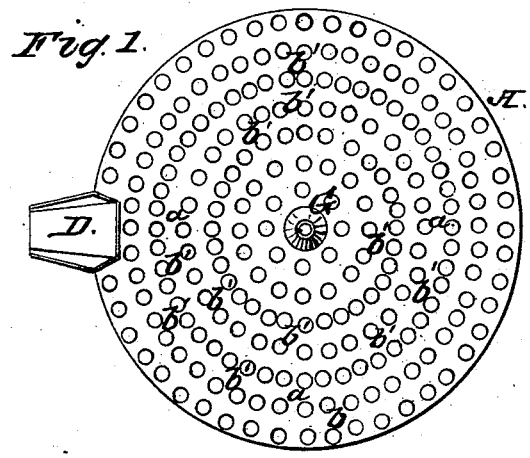
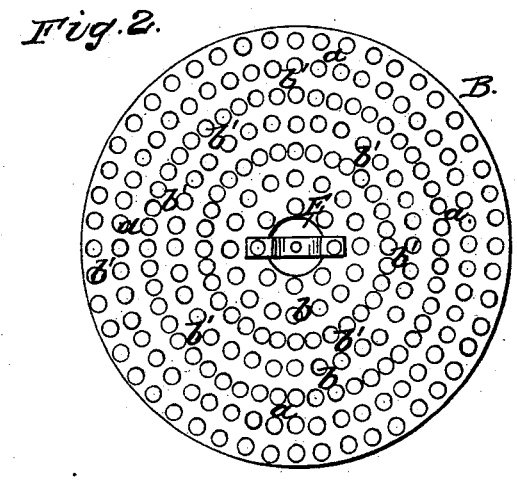
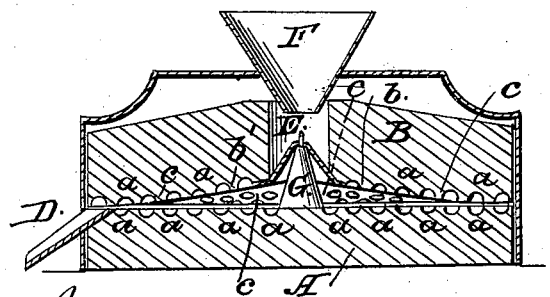
Witnesses
John Davy Jr.
John Nesbit
Inventor
Andrew Crawford

ANDREW CRAWFORD, OF WILKESBARRE, PENNSYLVANIA.

*Letters Patent No. 87,093, dated February 23, 1869.*

IMPROVED CELLULAR BUCKWHEAT-HULLER.

The Schedule referred to in these Letters Patent and making part of the same.

*To all whom it may concern:*

Be it known that I, ANDREW CRAWFORD, of Wilkesbarre, in the county of Luzerne, and State of Pennsylvania, have invented certain new and useful Improvements in Mills for Hulling Buckwheat and other Grain, which I call "The Cellular Sandstone Huller;" and I do hereby declare the following to be a full, clear, and exact description thereof, reference being had to the annexed drawings of the same, which make part of this specification, and in which—

Figure 1 represents a plan or top view of the bed-stone;

Figure 2, a plan of the bottom side of the runner, showing the cellular surfaces of the hullers; and Figure 3, a vertical section of the upper and lower stones put together, showing the chamber in the face of the runner.

There is no kind of grain so filthy as buckwheat, and none which holds the sand and dirt so much; and there is no flour so full of dirt and sand, and none generally darker than that of buckwheat; yet, strange to say, there is no grain whiter than that of buckwheat, and all that makes it so dark and motley is the dirt and the hulls or skins, and the little particles of the blossom-end of the buckwheat, that are ground up and become as fine as the flour; and this is what makes buckwheat-cakes so dark and heavy.

I am aware that hulling-surfaces have been constructed, with grooves and ribs, in a variety of forms, as well as with projections, which interlace with each other, and rub the grain upon and against them.

Toothed and ribbed cylinders and cones, fitted and operated within toothed and ribbed concaves, of a variety of construction, have been made for the purpose of hulling grain; and, while all these will imperfectly hull grain, none of them fail, also, to cut and mash it to pieces, to a greater or less extent; and my experience, in the construction and use of hulling-mills, is, that no surface having projections of any form is adapted to separating the hull or skin from the kernel, and particularly to clean it of its gritty blossom.

My improved hulling-surface is made and adapted to holding the grain, so that each grain will act as a rubber, and thus receive sufficient abrasion to rub off its hull.

This improvement consists in dressing the surfaces of the bed A and runner B, which are of common sandstone, with shallow cavities, or indentations *a*, so as to cover the adjacent faces of the two stones.

These cells are as close together as they can be conveniently dressed or drilled into the face of the stones, and they are made sufficiently shallow to prevent them from holding the grain, so that it will not pass out, under the centrifugal force of the runner; but each cell, nevertheless, forms a stop to the grain, both above and below, and forms a series of scouring holders, to hold the grain, and allow it to turn and roll in its seat while being rubbed on all its sides between the cellular surfaces, and upon and against intervening grain, and in this manner it is subjected to a perfect rubbing and scouring, which loosens and separates the shell, while no part of the surface of either stone has the least angular projection which would cut, break, or grind the grain.

I have discovered, from much experience, that the skin or coating of grain cannot be separated from grain between perfectly flat planes, that will admit only of the passage of a single grain between them, without cutting or grinding the grain.

To remedy this, I make a chamber, C, in the cellular surface of the runner, by making it a section of two truncated cones, the sides of the central cone, *b*, being of a greater angle than those of the outer one, *c*, and forming, with the surface of the bed-stone, a chamber, whose vertical depth diminishes from the centre to the circumference, leaving only sufficient space to permit the grain to pass out into the discharging-spout D.

This chamber, C, receives the grain from the eye E of the stone, and holds it in such a manner as to slightly crowd it into the cells, and between the moving and fixed stones, so that the cellular surface of the runner acts as an inclined rubbing-board upon the grain, so that, between the perfectly flat surface of the bed and the inclined sides of the rubbing-chamber of the runner, the grain cannot escape without being thoroughly rubbed and peeled of its shell.

The chamber, therefore, performs a very important function, in connection with the cellular surfaces, because it holds the grain in such a manner as to rub grain against grain, first, under slight pressure, the greatest depth of the chamber being next to the eye, for that purpose; and, secondly, under an increased pressure, by the direct action of the rough surfaces of the stones, in the lesser angle of the chamber, so that not a single grain can pass out between the stones without being rubbed and scoured, under sufficient pressure to remove the hull and blossom from the kernel.

In hulling rye, I have found that the cellular surfaces will take off all the germinating-end that makes the flour strong when ground with it, and which no huller heretofore constructed, to my knowledge, will do.

The cells are made by a sharp-pointed pick, or drilled, and are about one-sixteenth of an inch deep, and made so as to leave as little flat surface as possible, the main point being to obtain a perfectly-indented surface, which, with the natural roughness of the stone itself, will take off the blossom-end of the grain, which is usually filled with sand and dirt, and clean it for the grinding-burrs.

The stones are made of sharp, hard rock, or sandstone, and the surfaces are dressed with a keen cut, previous to being indented, so that whatever surface may intervene between the cells, will be rough and biting, so as to rasp the skin off the grain.

The grain is received, from the hopper F, through the eye of the runner, and distributed upon the bed-stone by the cone G, in the usual manner, and when it leaves the huller, by the spout D, it enters a fan-case, where all the dirt and hulls are separated, and the grain screened and taken into the grinding-burrs.

All the adjustments necessary to the perfect feeding of the grain, and of the several parts of the mill, may be made in the usual manner.

I am aware that millstones for grinding grain have been made with deep holes or cells formed in the landsides, and used in connection with furrows and rubbing-surfaces; but I do not claim an arrangement of cells with grooves and landsides. Neither is this like my invention.

I am also aware that a perforated or grated plate, with sharp, jagged projections, has been arranged around the bed-stone, near its circumference, but this, also, is a very different thing from my invention.

I do not claim millstones having cells or cavities in raised teeth or projections, in the surfaces thereof, as such an arrangement of cells is not new, having been patented to O. W. Stanford, January 11, 1859; neither is it possible for such an arrangement of teeth and cells to be adapted to the hulling of grain without breaking, crushing, or grinding it; neither do I claim a cellular, grated, or jagged surface, because my improvement is intended to remedy the defects and objections to a cutting or hackling-surface; but, What I do claim as my invention, is—

The runner B and bed-stone A, having shallow cells $a$ therein, feeding and supporting-cone G, intermediate flat spaces $b'$, flush with the edges of said cells, and a chamber, C, in the runner, diminishing in depth from the centre to the circumference, the whole being free from jagged teeth, or any projection whatever, all operating as herein described.

ANDREW CRAWFORD.

Witnesses:
    JOHN DAVIS, Jr.,
    JOHN NESBIT.